US009893912B1

United States Patent
(12) United States Patent
Wei et al.

(10) Patent No.: US 9,893,912 B1
(45) Date of Patent: Feb. 13, 2018

(54) EQUALIZER ADJUSTMENT METHOD, ADAPTIVE EQUALIZER AND MEMORY STORAGE DEVICE

(71) Applicant: PHISON ELECTRONICS CORP., Miaoli (TW)

(72) Inventors: Wei-Ting Wei, Yilan County (TW); Wei-Yung Chen, Hsinchu County (TW); Chao-Hsin Lin, Hsinchu County (TW); Chih-Ming Chen, Hsinchu County (KR)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 15/493,139

(22) Filed: Apr. 21, 2017

(30) Foreign Application Priority Data

Feb. 20, 2017 (TW) ............................ 106105545 A

(51) Int. Cl.
*H04L 25/03* (2006.01)
*H04L 27/26* (2006.01)
*H04L 27/01* (2006.01)

(52) U.S. Cl.
CPC .... *H04L 25/03949* (2013.01); *H04L 27/2614* (2013.01); *H04L 27/01* (2013.01)

(58) Field of Classification Search
CPC ........... H04L 25/03949; H04L 27/2614; H04L 25/03019; H04L 27/01
See application file for complete search history.

(56) References Cited

U.S. PATENT DOCUMENTS

| | | | | |
|---|---|---|---|---|
| 5,828,657 | A * | 10/1998 | Betts | H04B 3/238 370/269 |
| 5,953,373 | A | 9/1999 | Park | |
| 6,169,761 | B1 * | 1/2001 | Marcoccia | H04B 1/7156 375/132 |
| 6,678,765 | B1 * | 1/2004 | Moscovici | G06F 13/126 375/222 |
| 9,467,314 | B1 | 10/2016 | Wei et al. | |
| 2003/0071721 | A1 * | 4/2003 | Manis | H04B 3/542 375/233 |
| 2005/0201454 | A1 | 9/2005 | Chaudhuri et al. | |
| 2009/0052507 | A1 * | 2/2009 | Eymann | H04L 25/03019 375/211 |
| 2016/0006544 | A1 * | 1/2016 | Cowley | H04L 1/205 375/226 |
| 2017/0012803 | A1 * | 1/2017 | Sasaki | H04L 25/03019 |

* cited by examiner

*Primary Examiner* — Jean B Corrielus
(74) *Attorney, Agent, or Firm* — JCIPRNET

(57) ABSTRACT

An exemplary embodiment provides an equalizer adjustment method. The method includes: performing a handshake operation to establish a connection with a host system by a memory storage device; in the handshake operation, receiving a first signal from the host system and performing a first modulation on the first signal by the adaptive equalizer; after the handshake operation is ended, receiving a second signal from the host system and performing a second modulation on the second signal according to a modulation result of the first modulation by the adaptive equalizer to compensate the second signal; and adjusting the adaptive equalizer according to a modulation result of the second modulation.

24 Claims, 10 Drawing Sheets

EQUALIZER ADJUSTMENT METHOD, ADAPTIVE EQUALIZER AND MEMORY STORAGE DEVICE

CROSS-REFERENCE TO RELATED APPLICATION

This application claims the priority benefit of Taiwan application serial no. 106105545, filed on Feb. 20, 2017. The entirety of the above-mentioned patent application is hereby incorporated by reference herein and made a part of this specification.

BACKGROUND

Technical Field

The disclosure relates to an adjustment mechanism for equalizer, and more particularly, to an equalizer adjustment method, an adaptive equalizer and a memory storage device.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

With advancements in signal transmission speed, requirements on performance of receivers for improving data reception capability have also become more intense. For example, the adaptive equalizer can be applied in a signal receiver to reduce a transmission error rate by performing compensation on channel response with channel estimation result. In various systems, the adaptive equalizer adjusts equalizer setting according to a preset adjustment mechanism only after a connection between a signal transmitter and a signal receiver is established, so as to generate a receiver signal conducive to analysis.

However, after the connection is established, a time length of an adjustment time preserved for adjusting the equalizer is usually very short and not enough for doing the complete test for all equalizer parameters and/or power modes. For example, based on the PCI Express (Peripheral Component Interconnect Express) standard, the adjustment time preserved for adjusting the equalizer is only about 2 milliseconds (ms). Thus, how to adjust the equalizer to a proper status within limited time range is indeed one of the research topics.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

Accordingly, the disclosure is directed to an equalizer adjustment method, an adaptive equalizer and a memory storage device, which are capable of improving an adjustment efficiency of the adaptive equalizer.

An exemplary embodiment of the disclosure provides an equalizer adjustment method for a memory storage device having an adaptive equalizer. The equalizer adjustment method includes: performing a handshake operation to establish a connection with a host system; in the handshake operation, receiving a first signal from the host system and performing a first modulation on the first signal by the adaptive equalizer; after the handshake operation is ended, receiving a second signal from the host system and performing a second modulation on the second signal according to a modulation result of the first modulation by the adaptive equalizer to compensate the second signal; and adjusting the adaptive equalizer according to a modulation result of the second modulation.

Another exemplary embodiment of the disclosure provides an adaptive equalizer which is used in a memory storage device. The adaptive equalizer includes an equalizer module and a control module. The control module is coupled to the equalizer module. In a period during which a handshake operation is performed by the memory storage device to establish a connection with a host system, the equalizer module is configured to receive a first signal from the host system and perform a first modulation on the first signal. After the handshake is ended, the equalizer module is further configured to receive a second signal from the host system and perform a second modulation on the second signal according to a modulation result of the first modulation to compensate the second signal. The control module is configured to adjust the equalizer module according to a modulation result of the second modulation.

Another exemplary embodiment of the disclosure provides a memory storage device, which includes a connection interface unit, a rewritable non-volatile memory module and a memory control circuit unit. The connection interface unit is configured to couple to a host system. The memory control circuit unit is coupled to the connection interface unit and the rewritable non-volatile memory module. The connection interface unit includes an adaptive equalizer. The memory control circuit unit is configured to perform a handshake operation to establish a connection with the host system. In the handshake operation, the adaptive equalizer is configured to receive a first signal from the host system and perform a first modulation on the first signal. After the handshake operation is ended, the adaptive equalizer is further configured to receive a second signal from the host system and perform a second modulation on the second signal according to a modulation result of the first modulation to compensate the second signal. The adaptive equalizer is further configured to perform a self-adjustment according to a modulation result of the second modulation.

Based on the above, in the period during which the handshake operation is performed by the memory storage device to establish the connection with the host system, the adaptive equalizer can perform the first modulation on the first signal from the host system. After the handshake operation is ended, the adaptive equalizer can perform the second modulation on the second signal according to the modulation result of the first modulation to compensate the second signal and perform the self-adjustment according to the modulation result of the second modulation. In this way, the adjustment efficiency of the adaptive equalizer can be improved.

To make the above features and advantages of the disclosure more comprehensible, several embodiments accompanied with drawings are described in detail as follows.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
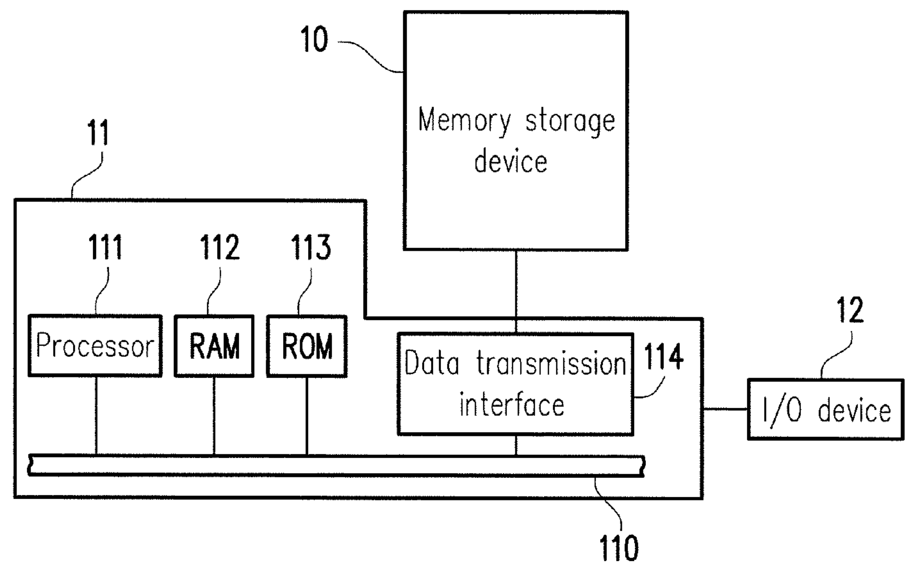
FIG. 1 is a schematic diagram illustrating a host system, a memory storage device and an I/O (input/output) device according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Embodiments are provided below to describe the present disclosure in detail, though the present disclosure is not limited to the provided embodiments, and the provided embodiments can be suitably combined. The term "coupling/coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." In addition, the term "signal" can mean a current, a voltage, a charge, a temperature, data or any one or multiple signals.

Generally, the memory storage device (also known as a memory storage system) includes a rewritable non-volatile memory module and a controller (also known as a control circuit). The memory storage device is usually configured together with a host system so the host system can write data into the memory storage device or read data from the memory storage device.

Figure 2:
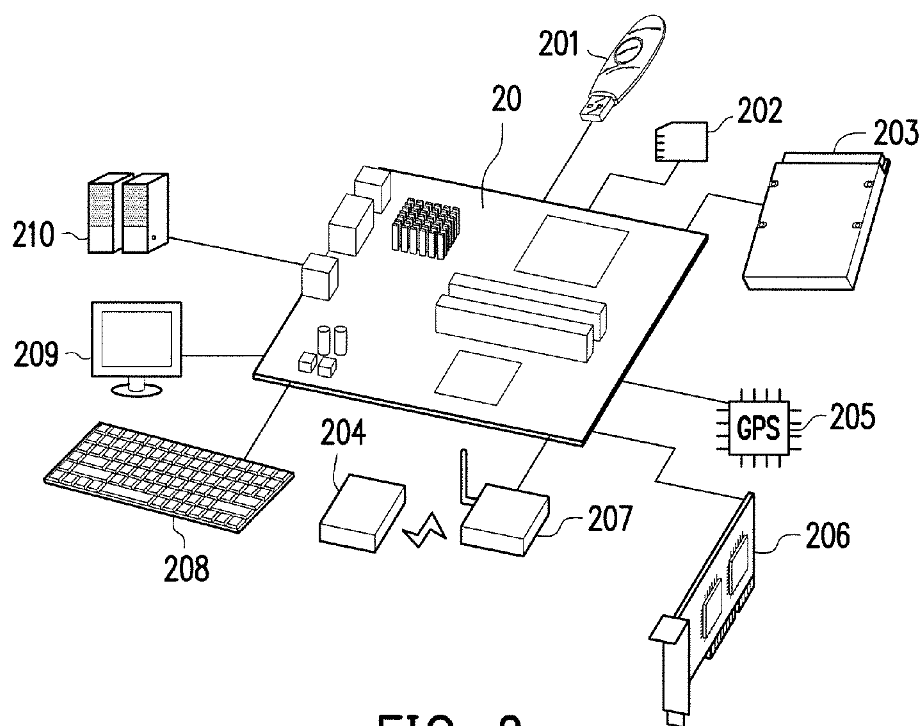
FIG. 2 is a schematic diagram illustrating a host system, a memory storage device and an I/O device according to another exemplary embodiment of the disclosure.

FIG. 1 is a schematic diagram illustrating a host system, a memory storage device and an I/O (input/output) device according to an exemplary embodiment of the disclosure. FIG. 2 is a schematic diagram illustrating a host system, a memory storage device and an I/O device according to another exemplary embodiment of the disclosure.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 can store data into the memory storage device 10 or read data from the memory storage device 10 through the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
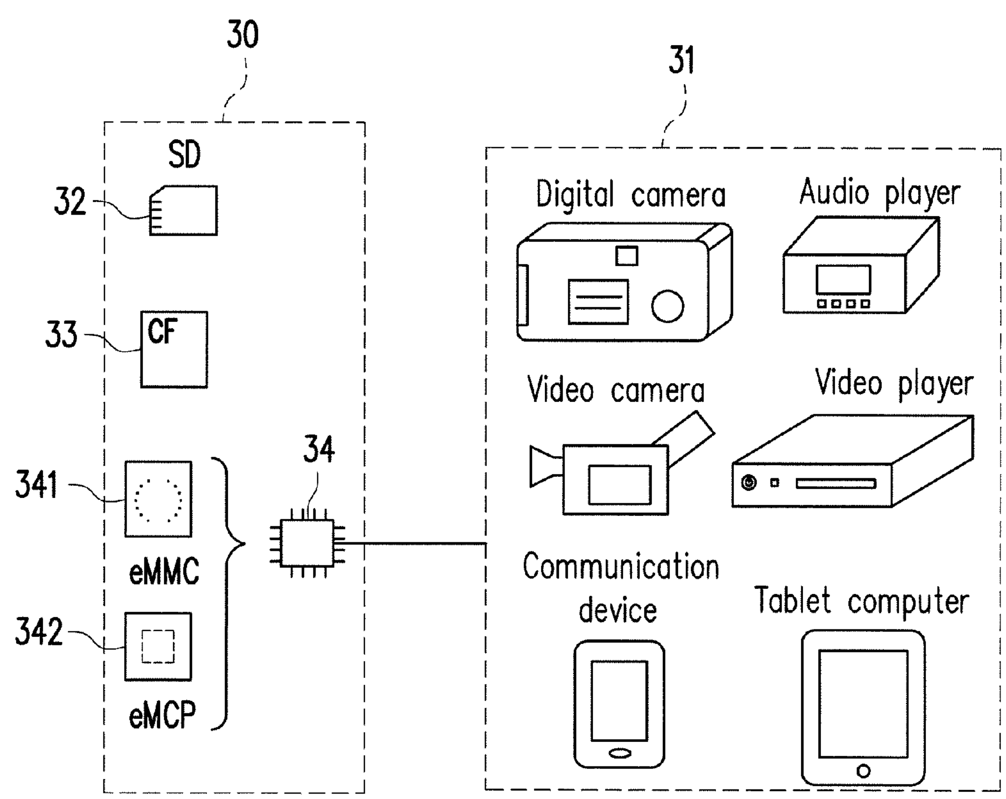
FIG. 3 is a schematic diagram illustrating a host system and a memory storage device according to another exemplary embodiment of the disclosure.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the disclosure. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system 31, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
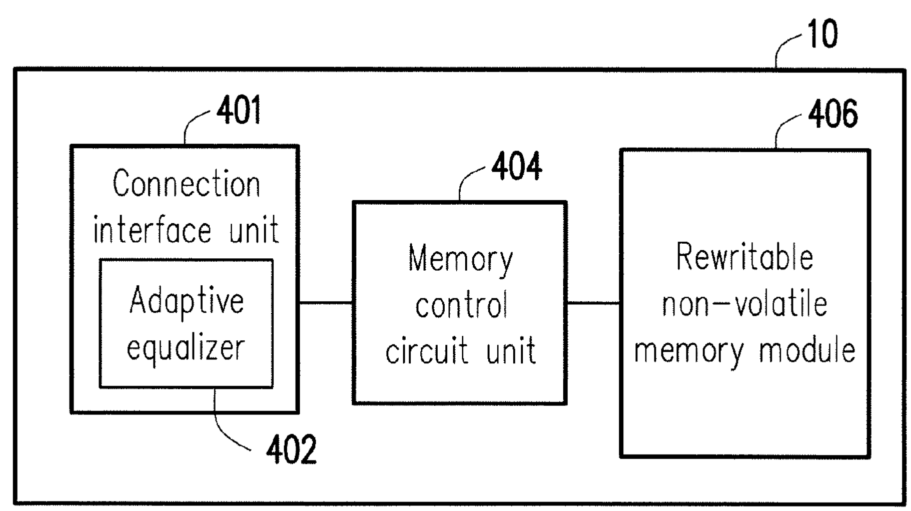
FIG. 4 is a schematic block diagram illustrating a memory storage device according to an exemplary embodiment of the disclosure.

FIG. 4 is a schematic block diagram illustrating a memory storage device according to an exemplary embodiment of the disclosure.

Referring to FIG. 4, the memory storage device 10 includes a connection interface unit 401, a memory control circuit unit 404 and a rewritable non-volatile memory module 406.

The connection interface unit 401 is configured to couple the memory storage device 10 to the host system 11. In the present exemplary embodiment, the connection interface unit 401 is compatible with a PCI Express (Peripheral Component Interconnect Express) standard. Nevertheless, it should be understood that the disclosure is not limited thereto. The connection interface unit 401 may also be compatible with a PATA (Parallel Advanced Technology Attachment) standard, an IEEE (Institute of Electrical and Electronic Engineers) 1394 standard, a SATA (Serial Advanced Technology Attachment) standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 401 and the memory control circuit unit 404 may be packaged into one chip, or the connection interface unit 401 is distributed outside of a chip containing the memory control circuit unit 404.

The memory control circuit unit 404 is configured to execute a plurality of logic gates or control commands which are implemented in a hardware form or in a firmware form and perform operations, such as writing, reading or erasing data in the rewritable non-volatile memory module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". Each of the memory cells in the rewritable non-volatile memory module 406 has a plurality of storage states depended on changes in the threshold voltage. The storage state to which the memory cell belongs may be determined by applying a read voltage to the memory cell, so as to obtain the one or more bits stored in the memory cell.

In the present exemplary embodiment, the memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store more than one bit, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is higher than a writing speed of the upper physical programming unit, and/or a reliability of the lower physical programming unit is higher than a reliability of the upper physical programming unit.

In the present exemplary embodiment, the physical programming unit is the minimum unit for programming. That is, the physical programming unit is the minimum unit for writing data. For example, the physical programming unit is a physical page or a physical sector. When the physical programming unit is the physical page, the physical programming unit usually includes a data bit area and a redundancy bit area. The data bit area includes multiple physical sectors configured to store user data, and the redundant bit area is configured to store system data (e.g., management data such as error correcting code, etc.). In the present exemplary embodiment, the data bit area includes 32 physical sectors, and a size of each physical sector is 512 bytes (B). However, in other exemplary embodiments, the data bit area may also include 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

In an exemplary embodiment, after the memory storage device 10 is connected to the host system 11 and powered on, the memory control circuit unit 404 performs a handshake operation with the host system 11. This handshake operation is configured to establish a connection between the memory storage device 10 and the host system 11. In a period during which the handshake operation is performed, the host system 11 transmits a signal (a.k.a. a first signal) to the memory storage device 10, and the memory control circuit unit 404 also transmits a signal (a.k.a. a third signal) to the host system 11 via the connection interface unit 401. For example, the third signal may be used to respond the first signal and/or the first signal is used to respond the third signal. Further, the first signal and the third signal are both used to establish the connection between the host system 11 and the memory storage device 10.

In an exemplary embodiment, after the handshake operation is started, if the memory storage device 10 stops transmitting signal (e.g., the third signal) to the host system 11, it can be determined that the handshake operation is ended. Moreover, in another exemplary embodiment, after the handshake operation is ended, the memory storage device 10 may also continuously transmit signal (e.g., the third signal or other signals) to the host system 11.

It should be noted that, certain connection interface standard does not specifically define whether or not the handshake operation must be performed before the connection between the host system 11 and the memory storage device 10 is established. Therefore, in an exemplary embodiment, if a signal exchange between the host system 11 and the memory storage device 10 occurs within one specific time range after the memory storage device 10 is connected to the host system 11, and/or if the signal from the host system 11 within one specific time range after the memory storage device 10 is connected to the host system 11 is used for establishing a connection between the memory storage device 10 and the host system 11 (e.g., for a clock synchronization), the specific time ranges can be regarded as the period during which the handshake operation is performed.

Before the connection between the memory storage device 10 and the host system 11 is established, the memory storage device 10 is unable to identify the commands from the host system 11 and the host system 11 is unable to identify the data from the memory storage device. Only after the connection between the memory storage device 10 and the host system 11 is established, the memory storage device 10 and the host system 11 are able to identify the received commands and/or the data. For example, after the connection between the memory storage device 10 and the host system 11 is established, the host system 11 can send a command that instructs the memory storage device 10 to perform a data access, and the memory storage device 10 can return a data access result corresponding to such command to the host system 11.

In the present exemplary embodiment, the connection interface unit 401 includes an adaptive equalizer 402. The adaptive equalizer 402 is configured to receive and modulate the signal from the host system 11. For example, after adjustment for the adaptive equalizer 402 is completed, the adaptive equalizer 402 may be used to modulate a data signal from the host system 11. For example, the data signal from the host system 11 is a differential signal and configured to deliver a series of bit data. For example, each one of the bit data refers to bit "0" or "1". In general, the signal from the host system 11 refers to a signal with channel loss. The channel loss being more or less is related to length and noise intensity of the transmitting channel (e.g., a wired/wireless channel). The adaptive equalizer 402 can compensate the signal with the channel loss so as to generate a receiver signal conducive to analysis.

Figure 5A:
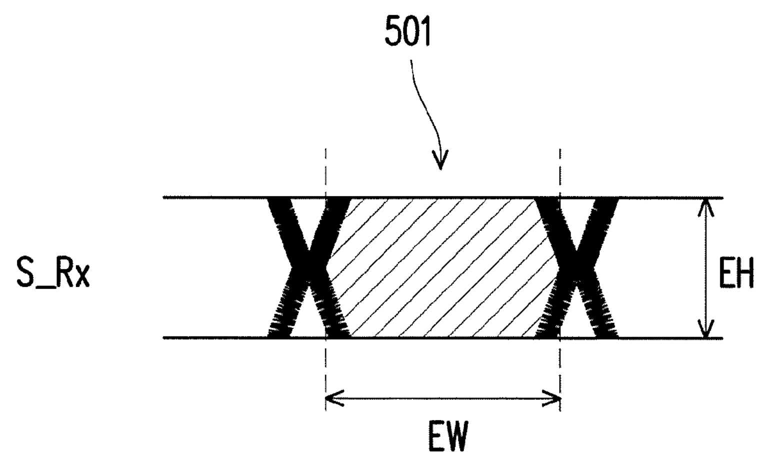
FIG. 5A and FIG. 5B are schematic diagrams illustrating an original signal and a modulated signal according to an exemplary embodiment of the disclosure.
Figure 5B:
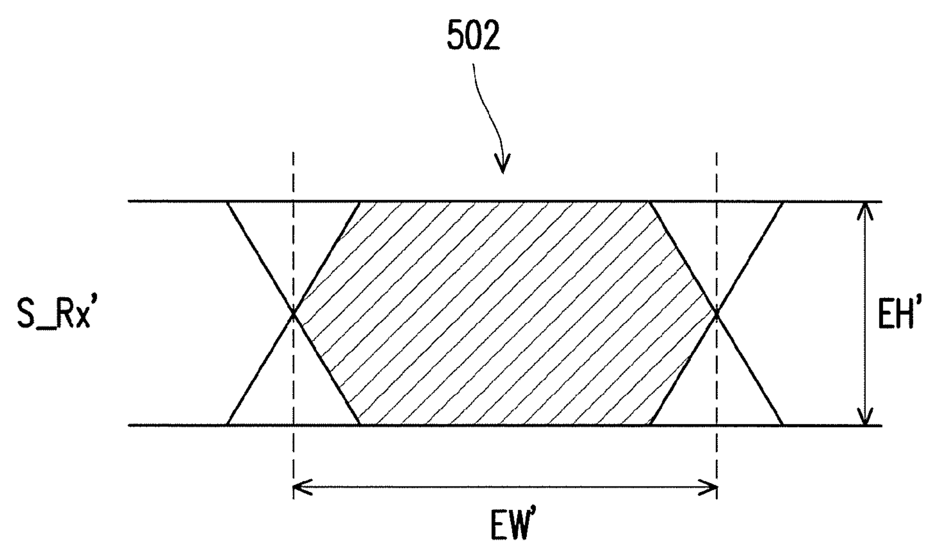

FIG. 5A and FIG. 5B are schematic diagrams illustrating an original signal and a modulated signal according to an exemplary embodiment of the disclosure.

With reference to FIG. 5A and FIG. 5B, a waveform of a signal S_Rx from the host system 11 may be regarded as including a plurality of eyes 501. Eye-width information of the signal S_Rx can be used to describe information including a width EW of the eye 501 (a.k.a. an eye-width of the signal S_Rx), a height EH of the eye 501 (a.k.a. an eye-height of the signal S_Rx) and/or a contour of the eye 501 (a.k.a. an eye-shape of the signal S_Rx). If the width EW of the eye 501 is very narrow, the height EH of the eye 501 is very narrow and/or the contour of the eye 501 is less conducive to analysis, sampling the signal S_Rx can be hard and prone to errors.

After the signal S_Rx is modulated, a signal S_Rx' is outputted and served as the receiver signal. A waveform of the signal S_Rx' may be regarded as including a plurality of eyes 502. Eye-width information of the signal S_Rx' can be used to describe information including a width EW' of the eye 502, a height EH' of the eye 502 and/or a contour of the eye 502. Compared to the eye 501, the width EW' of the eye 502 is wider (i.e., the width EW'>the width EW), the height EH' of the eye 502 is wider (i.e., the height EH'>the height EH) and/or the contour of the eye 502 is more conducive to analysis. Thus, compared to the signal S_Rx, sampling the signal S_Rx' can be easier and more precise. In an exemplary embodiment, the operation of modulating the signal S_Rx into the signal S_Rx' may also be regarded as to compensate the signal S_Rx in order to overcome the channel loss of the signal S_Rx.

In an exemplary embodiment, the adaptive equalizer 402 may also be used together with a clock and data recovery (CDR) circuit. For example, the clock and data recovery circuit can receive signal (e.g., the signal S_Rx') outputted by the adaptive equalizer 402 and accordingly perform a phase lock operation to generate an output clock. For example, the output clock can be used by the connection interface unit 401, the adaptive equalizer 402, the memory control circuit unit 404, the rewritable non-volatile memory module 406 or the rest of electronic circuits in the memory storage device 10.

In general, depending on different use environments or device conditions, a status of the channel between the host system 11 and the memory storage device 10 may be different such that the channel loss of the signal from the host system 11 may also be different. In an exemplary embodiment, in correspondence to the different channel statuses, the adaptive equalizer 402 dynamically configures a power mode to be used. It should be noted that, a compensation ability of one power mode for the signal is often in positive correlation with a power consumption of that power mode. Thus, in an environment with minor signal loss, the adaptive equalizer 402 tends to operate in a power mode with lower power consumption so as to maintain the basic compensation ability for the received signal while also saving power. Also, in an environment with larger signal loss, the adaptive equalizer 402 tends to operate in a power mode with higher power consumption so as to enhance the compensation ability for the received signal. Nonetheless, operating in the power mode with higher power consumption also means higher amount of electricity consumed. In this way, the adaptive equalizer 402 can voluntarily seek for balance between the power consumption and the compensation ability.

In an exemplary embodiment, the adaptive equalizer 402 can also modulate the received signal by using different equalizer parameters thereby changing a waveform and a signal quality of the outputted signal. For example, the signal quality of the signal can be evaluated by utilizing the eye-width information of the signal. According to the signal quality of the outputted signal, the adaptive equalizer 402 can determine the equalizer parameter most suitable for the current use and modulate subsequent signals (e.g., the data signal) from the host system 11 by that equalizer parameter.

In the present exemplary embodiment, before the connection between the memory storage device 10 and the host system 11 is established (e.g., in the period during which the handshake operation is performed), the connection interface unit 401 receives signal (i.e., the first signal) from the host system 11, and the adaptive equalizer 402 performs a modulation (a.k.a. a first modulation) on the first signal. For example, in the first modulation, the adaptive equalizer 402 can modulate the first signal according to at least one equalizer setting (a.k.a. first equalizer settings) and analyze a modulation result of the first modulation. In an exemplary embodiment, the first signal is compensated based on at least one of the first equalizer settings in the first modulation. For example, according to different equalizer settings among the first equalizer settings, multiple compensated first signals can be outputted. Then, the adaptive equalizer 402 can analyze the compensated first signals.

After the connection between the memory storage device 10 and the host system 11 is established (e.g., after the handshake operation is ended), the connection interface unit 401 receives another signal (a.k.a. a second signal) from the host system 11, and the adaptive equalizer 402 performs another modulation (a.k.a. a second modulation) on the second signal according to the modulation result of the first modulation. For example, in the second modulation, the adaptive equalizer 402 can modulate the second signal according to at least one of additional equalizer settings (a.k.a. second equalizer settings) to compensate the second signal. In an exemplary embodiment, a pattern of the first signal is different from a pattern of the second signal. In another exemplary embodiment, it is also possible that the pattern of the first signal is identical to the pattern of the second signal.

In an exemplary embodiment, the memory storage device 10 does not transmit signal to the host system 11 in a period during which the second modulation is performed. In an exemplary embodiment, the period during which the second modulation is performed may be regarded as one preset time interval used (or dedicated) for adjusting the adaptive equalizer 402. For example, according to the PCI Express standard, this preset time interval is only about 2 milliseconds (ins). Also, depending on different connection interface standards, this preset time interval may also be longer or shorter.

In an exemplary embodiment, this preset time interval is subsequent to the period during which the handshake operation is performed. Accordingly, in an exemplary embodiment, after the handshake operation is started, if the memory storage device 10 stops transmitting signal (e.g., the third signal) to the host system 11, it is considered that the handshake operation is ended and the preset time interval is being entered. For example, after the handshake operation is completed (or ended), the host system 11 may be switched to transmit the second signal so the adaptive equalizer 402 can perform the second modulation according to the second signal. In another exemplary embodiment, it is also possible that other signal transmission phases are included in between the period during which the handshake operation is performed and the period during which the second modulation is performed. In the exemplary embodiment where the other signal transmission phases are included in between the period during which the handshake operation is performed and the period during which the second modulation is performed, the period during which the handshake operation is performed and the period during which the second modulation is performed are not continuous.

It should be noted that, in an exemplary embodiment, after the preset time interval is elapsed, the host system 11 starts to transmit the data signal. For example, the data signal may be used to transmit various commands which instruct the memory storage device 10 to perform operations like the data access. In an exemplary embodiment, before the preset time interval is elapsed, signal from the host system 11 (e.g., the first signal and/or the second signal) can be considered as a testing signal (or a connecting signal). The adaptive equalizer 402 can perform the first modulation and/or the second modulation on the testing signal (or the connecting signal).

The adaptive equalizer 402 can perform a self-adjustment according to a modulation result of the second modulation. For example, according to different equalizer settings among the second equalizer settings, multiple compensated second signals can be outputted. Then, the adaptive equalizer 402 can analyze the compensated second signals and perform the self-adjustment according to an analysis result so as to determine the equalizer parameter most suitable for the current use (a.k.a. an optimal equalizer parameter).

In an exemplary embodiment, the adaptive equalizer 402 can also perform the self-adjustment according to the modulation result of the first modulation. For example, in an exemplary embodiment, according to the modulated first signal, the adaptive equalizer 402 can determine one power mode. For example, such power mode can be selected from a plurality of candidate power modes. Then, in the period during which the second modulation is performed, the adaptive equalizer 402 can modulate the second signal by using at least one equalizer parameter based on the determined power mode.

In an exemplary embodiment, the candidate power modes include at least two of a Continuous-Time Linear Equalizer (CTLE) low power mode, a Continuous-Time Linear Equalizer high power mode and a Decision Feedback Equalizer (DEF) mode. In another exemplary embodiment, these candidate power modes may also include other power modes rather than being limited to the above. In an exemplary embodiment, one of the candidate power modes is also known as a first power mode and another one of the candidate power mode is also known as a second power mode. In another exemplary embodiment, these candidate power modes may also include a third power mode or even more power modes, which are not particularly limited in the disclosure.

In an exemplary embodiment, the compensation ability of the Decision Feedback Equalizer mode for the channel loss is higher than the compensation ability of the Continuous-Time Linear Equalizer high power mode for the channel loss, and the compensation ability of the Continuous-Time Linear Equalizer high power mode for the channel loss is higher than that of the Continuous-Time Linear Equalizer low power mode. In an exemplary embodiment, the power consumption of the adaptive equalizer 402 performing the signal modulation based on the Continuous-Time Linear Equalizer low power mode is lower than the power consumption of the adaptive equalizer 402 performing the signal modulation based on the Continuous-Time Linear Equalizer high power mode, and the power consumption of the adaptive equalizer 402 performing the signal modulation based on the Continuous-Time Linear Equalizer high power mode is lower than the power consumption of the adaptive equalizer 402 performing the signal modulation based on the Decision Feedback Equalizer mode.

In an exemplary embodiment, the modulation result of the first modulation (e.g., the modulated first signal) reflects the current channel status between the memory storage device 10 and the host system 11. Therefore, the adaptive equalizer 402 can obtain the current channel status between the memory storage device 10 and the host system 11 according to the modulation result of the first modulation. If the modulation result of the first modulation shows that the current channel status between the memory storage device 10 and the host system 11 matches a first condition, the adaptive equalizer 402 determines the Continuous-Time Linear Equalizer low power mode to be the power mode used in the second modulation; if the modulation result of the first modulation shows that the current channel status between the memory storage device 10 and the host system 11 matches a second condition, the adaptive equalizer 402 determines the Continuous-Time Linear Equalizer high power mode to be the power mode used in the second modulation; and if the modulation result of the first modulation shows that the current channel status between the memory storage device 10 and the host system 11 matches a third condition, the adaptive equalizer 402 determines the Decision Feedback Equalizer mode to be the power mode used in the second modulation. Among them, the channel status matching the first condition is better than the channel status matching the second condition, and the channel status matching the second condition is better than the channel status matching the third condition. Further, in another exemplary embodiment, the adaptive equalizer 402 may also determine other power modes to be used in the second modulation according to that the current channel status matches one specific condition, which are not particularly limited in the disclosure.

In an exemplary embodiment, in the period during which the second modulation is performed, the power mode used by the adaptive equalizer 402 is unchanged. For example, in the period during which the second modulation is performed, the adaptive equalizer 402 can modulate the second signal by using different equalizer parameters based on the same power mode. Further, in another exemplary embodiment, in the period during which the second modulation is performed, the power mode used by the adaptive equalizer 402 may also be changed at least once. For example, changing the power mode refers to switching the power mode used by the adaptive equalizer 402 from the originally determined power mode into another power mode.

Figure 6:
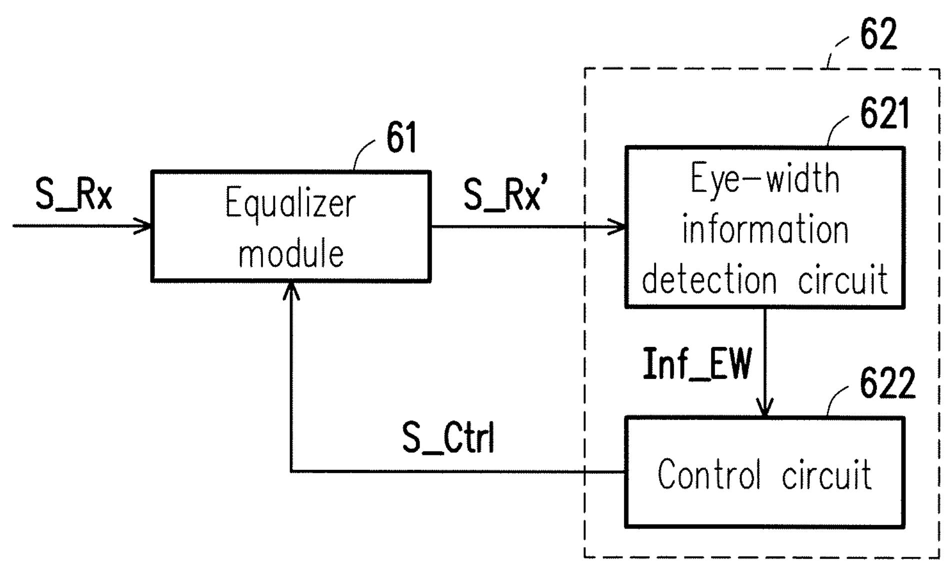
FIG. 6 is a schematic diagram illustrating an adaptive equalizer according to an exemplary embodiment of the disclosure.

FIG. 6 is a schematic diagram illustrating an adaptive equalizer according to an exemplary embodiment of the disclosure.

Referring to FIG. 6, the adaptive equalizer 402 includes an equalizer module 61 and a control module 62. The equalizer module 61 is coupled to the control module 62. The equalizer module 61 can receive the signal S_Rx from the host system and a signal S_Ctrl (a.k.a. a control signal) from the control module 62. For example, in a period during which the first modulation is performed, the signal S_Rx includes the first signal; in the period during which the second modulation is performed, the signal S_Rx includes the second signal. The signal S_Ctrl is generated by the control module 62 according to at least one equalizer setting. In addition, according to the signal S_Ctrl, the equalizer module 61 operates in a specific power mode and modulates the signal S_Rx by using specific equalizer parameter.

In the present exemplary embodiment, the equalizer module 61 includes the Continuous-Time Linear Equalizer and the Decision Feedback Equalizer. Based on the power mode being configured, at least one of the Continuous-Time Linear Equalizer and the Decision Feedback Equalizer is used for modulating the signal S_Rx. For example, if the configured power mode is the Continuous-Time Linear Equalizer low power mode, the Continuous-Time Linear Equalizer is used and operates in a low power mode. Alternatively, if the configured power mode is the Continuous-Time Linear Equalizer high power mode, the Continuous-Time Linear Equalizer is used and operates in a high power mode. Alternatively, if the configured power mode is the Decision Feedback Equalizer mode, the Decision Feedback Equalizer is used. In an exemplary embodiment, using one specific equalizer refers to activating or enabling that equalizer, whereas the unused equalizer is deactivated or disabled. Further, in certain power modes, multiple equalizers in the equalizer module 61 may also be used together and details regarding the same are omitted herein. In another exemplary embodiment, the equalizer module 61 may also include equalizers of other types. After modulating the signal S_Rx, the equalizer module 61 outputs the signal S_Rx'.

In the present exemplary embodiment, the control module 62 includes an eye-width information detection circuit 621 and a control circuit 622. The eye-width information detection circuit 621 is coupled to the equalizer module 61 and configured to detect eye-width information Inf_EW of the signal S_Rx'. For example, the eye-width information detection circuit 621 can analyze the signal S_Rx' and generate parameters related to the signal quality of the signal S_Rx' for describing the eye-width, the eye-height and/or the eye-shape of the signal S_Rx'. For example, the eye-width information detection circuit 621 includes at least one of an eye-width detector, an eye-height detector and an eye-shape detector. The control circuit 622 is coupled to the eye-width information detection circuit 621 and the equalizer module 61 and can be used to generate the signal S_Ctrl. For example, the control circuit 622 can include various control circuits such as an embedded controller or a microcontroller.

Figure 7:
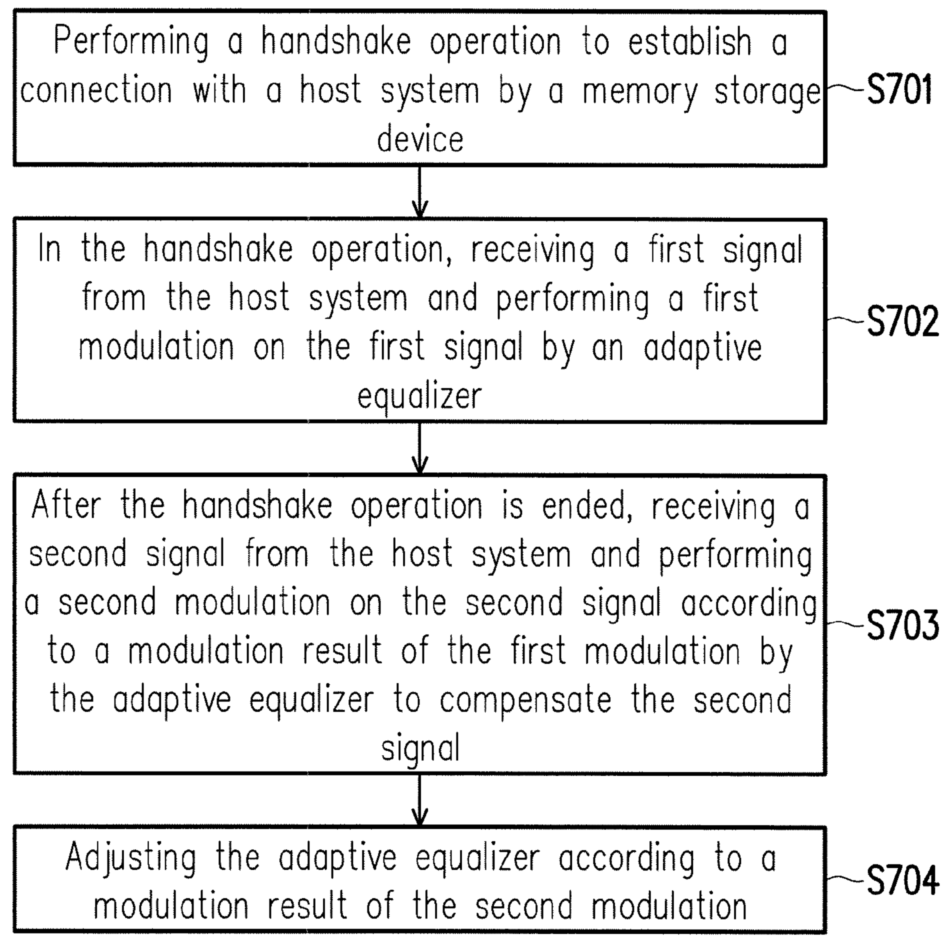
FIG. 7 is a flowchart illustrating an equalizer adjustment method according to an exemplary embodiment of the disclosure.

FIG. 7 is a flowchart illustrating an equalizer adjustment method according to an exemplary embodiment of the disclosure.

Referring to FIG. 1, FIG. 4 and FIG. 7, in step S701, a handshake operation is performed to establish a connection with the host system 11 by the memory storage device 10. In step S702, in the handshake operation, a first signal is received from the host system 11 and a first modulation is performed on the first signal by the adaptive equalizer 402. In step S703, after the handshake operation is ended, a second signal is received from the host system 11 and a second modulation is performed on the second signal according to a modulation result of the first modulation by the adaptive equalizer 402 to compensate the second signal. In step S704, the adaptive equalizer 402 is adjusted according to a modulation result of the second modulation.

Figure 8:
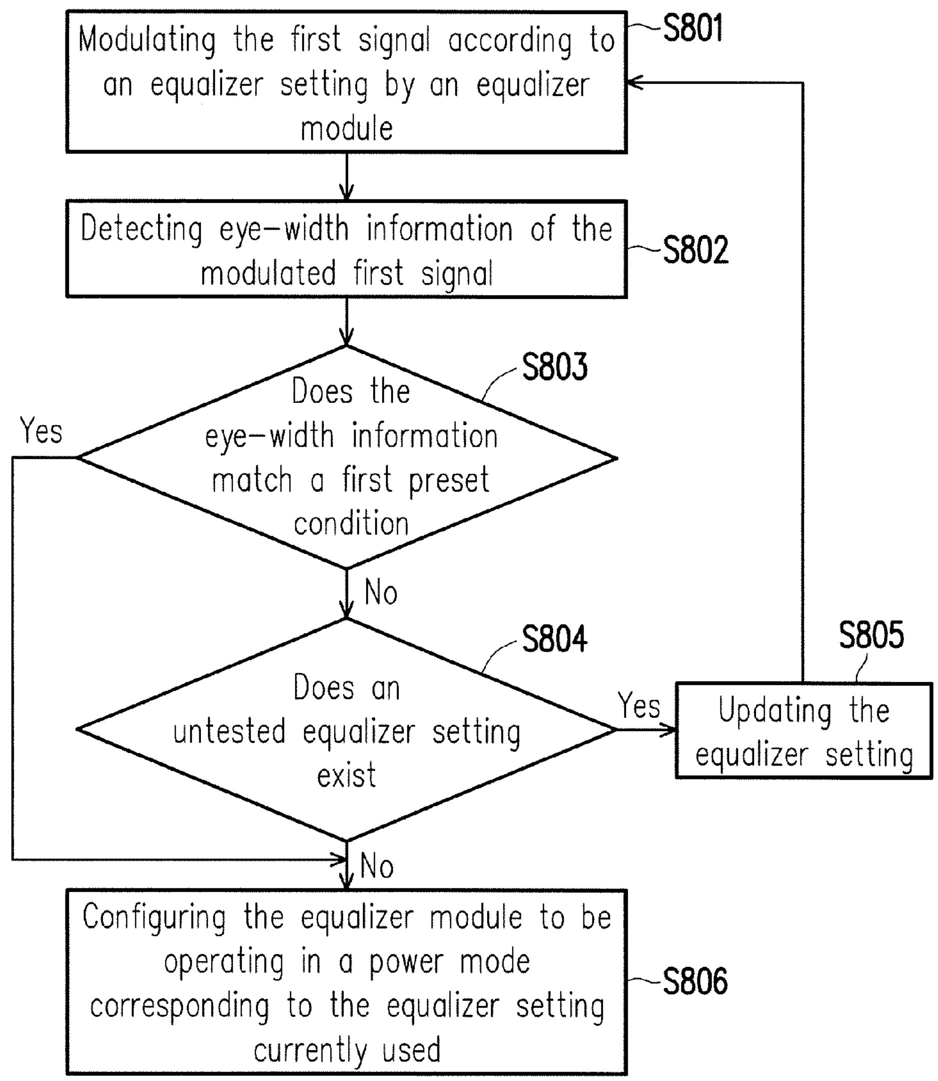
FIG. 8 is a flowchart illustrating an equalizer adjustment method according to another exemplary embodiment of the disclosure.

FIG. 8 is a flowchart illustrating an equalizer adjustment method according to another exemplary embodiment of the disclosure. It should be noted that, the process in FIG. 8 refers to details of step S702 in one exemplary embodiment of FIG. 7.

Referring to FIG. 6 and FIG. 8, in step S801, the signal S_Rx (i.e., the first signal) is modulated according to one equalizer setting by the equalizer module 61 so as to generate the signal S_Rx'. In step S802, the eye-width information detection circuit 621 detects the eye-width information Inf_EW of the signal S_Rx' (i.e., the modulated first signal). In step S803, the control circuit 622 determines whether the eye-width information Inf_EW matches a first preset condition. In the present exemplary embodiment, the control circuit 622 determines whether the eye-width information Inf_EW matches the first preset condition according to the eye-width of the signal S_Rx'. For example, the control circuit 622 can determine whether the eye-width of the signal S_Rx' is greater than the first preset eye-width. If the eye-width of the signal S_Rx' is greater than the first preset eye-width, the control circuit 622 can determine that the eye-width information Inf_EW matches the first preset condition. Otherwise, if the eye-width of the signal S_Rx' is not greater than the first preset eye-width, the control circuit 622 can determine that the eye-width information Inf_EW does not match the first preset condition. Further, in another exemplary embodiment, the control circuit 622 can also determine whether the eye-width information Inf_EW matches the first preset condition according to information like the eye-height of the signal S_Rx' and/or the eye-shape of the signal S_Rx'.

If the eye-width information Inf_EW matches the first preset condition, in step S806, the control circuit 622 configures the equalizer module 61 to be operating in a power mode corresponding to the equalizer setting currently being used. If the eye-width information Inf_EW does not match the first preset condition, in step S804, whether an untested equalizer setting exists is determined. If the untested equalizer setting exists, in step S805, the control circuit 622 updates the equalizer setting and returns to step S801. For example, the control circuit 622 updates the equalizer setting used by the equalizer module 61 from the current equalizer setting into the next untested equalizer setting. In step S801, the subsequently received signal S_Rx (i.e., the first signal) is modulated according to the updated equalizer setting by the equalizer module 61, and then steps S802 and S803 are repeated. On the other hand, if the untested equalizer setting does not exist (i.e., all the equalizer settings have been tested), the process proceeds to step S806 after step S804.

In an exemplary embodiment of FIG. 8, the first used (tested) equalizer setting corresponds to a power mode with the lowest power consumption, and the last used (or tested) equalizer setting corresponds to a power mode with the highest power consumption. In the example with the Continuous-Time Linear Equalizer low power mode, the Continuous-Time Linear Equalizer high power mode and the Decision Feedback Equalizer mode, the first used equalizer setting may correspond to the Continuous-Time Linear Equalizer low power mode, the next used equalizer setting may correspond to the Continuous-Time Linear Equalizer high power mode, and the last used equalizer setting may correspond to the Decision Feedback Equalizer mode. In another exemplary embodiment, different equalizer settings corresponding to different power modes may also be used in testing by a different sequence.

Figure 9:
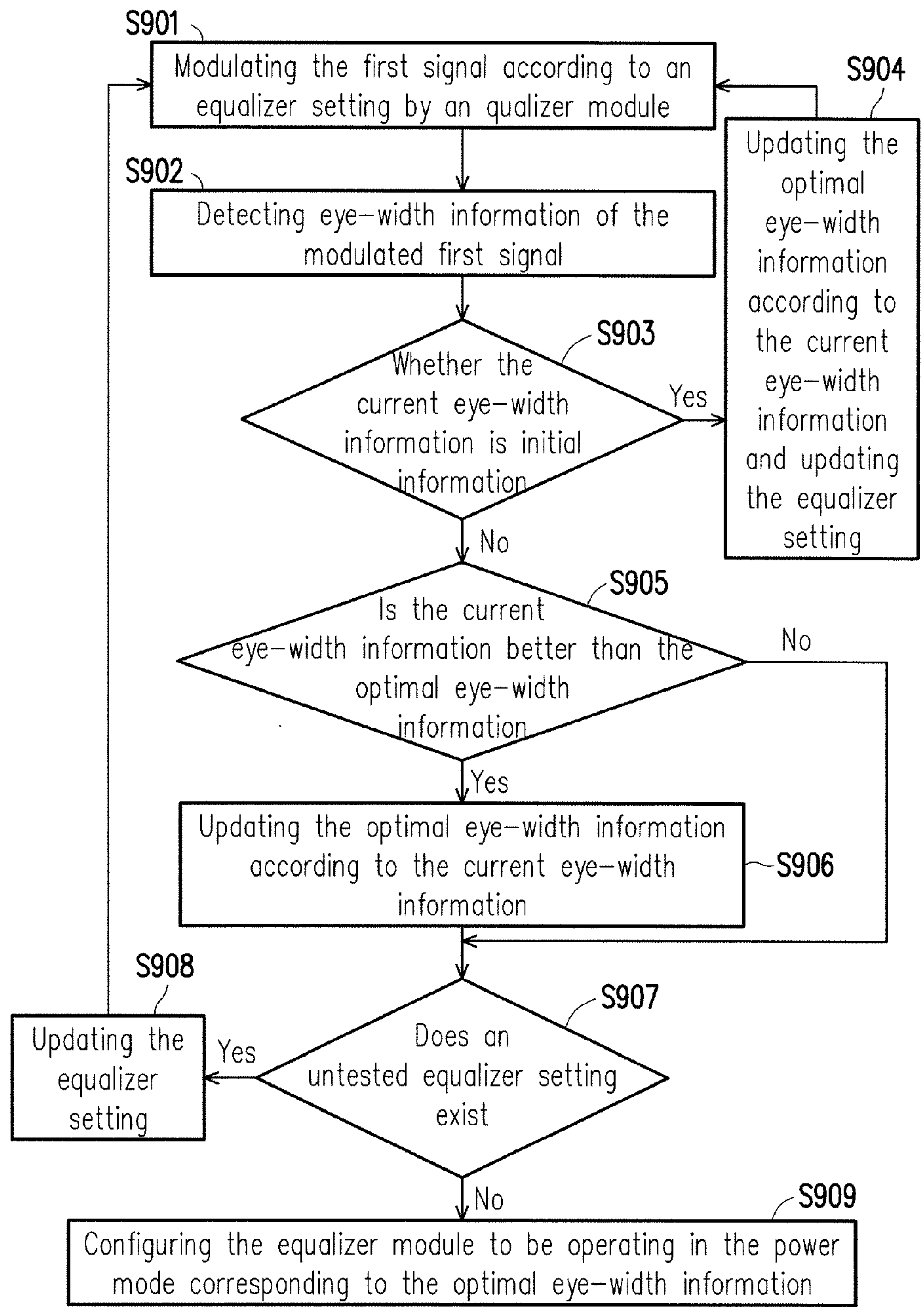
FIG. 9 is a flowchart illustrating an equalizer adjustment method according to another exemplary embodiment of the disclosure.

FIG. 9 is a flowchart illustrating an equalizer adjustment method according to another exemplary embodiment of the disclosure. It should be noted that, the process in FIG. 9 refers to details of step S702 in another exemplary embodiment of FIG. 7.

Referring to FIG. 6 and FIG. 9, in step S901, the signal S_Rx (i.e., the first signal) is modulated according to one equalizer setting by the equalizer module 61 so as to generate the signal S_Rx'. In step S902, the eye-width information detection circuit 621 detects the eye-width information Inf_EW of the signal S_Rx' (i.e., the modulated first signal). In step S903, the control circuit 622 determines whether the current eye-width information Inf_EW is initial information (i.e., the first recorded eye-width information). If the current eye-width information Inf_EW is the initial information, in step S904, the control circuit 622 updates the optimal eye-width information according to the current eye-width information Inf_EW and updates the equalizer setting. For example, the control circuit 622 can record the current eye-width info' nation Inf_EW to be a temporary value of the optimal eye-width information. After step S904, the process returns to step S901 in which the subsequently received signal S_Rx (i.e., the first signal) is modulated according to the updated equalizer setting by the equalizer module 61. Then, steps S902 and S903 are repeated.

If the current eye-width information Inf_EW is not the initial information (i.e., the optimal eye-width information has already been stored), in step S905, the control circuit 622 determines whether the current eye-width information Inf_EW is better than the optimal eye-width information. For example, the control circuit 622 can determine whether the eye-width of the signal S_Rx' is greater than an eye-width corresponding to the optimal eye-width information. If the eye-width of the current signal S_Rx' is greater than the eye-width corresponding to the optimal eye-width information, the control circuit 622 can determine that the current eye-width information Inf_EW is better than the optimal eye-width information. Conversely, if the eye-width of the current signal S_Rx' is not greater than the eye-width corresponding to the optimal eye-width information, the control circuit 622 can determine that the current eye-width information Inf_EW is not better than the optimal eye-width information. It should be noted that, in another exemplary embodiment, the control circuit 622 may also determine whether the current eye-width information Inf_EW is better than the optimal eye-width information according to the eye-height and/or the eye-shape of the current signal S_Rx'.

If the current eye-width information Inf_EW is better than the optimal eye-width information, in step S906, the control circuit 622 updates the optimal eye-width information according to the current eye-width information Inf_EW. For example, the control circuit 622 can replace the temporary value of the optimal eye-width information by the current eye-width information Inf_EW. Further, if the current eye-width information Inf_EW is not better than the optimal eye-width information, the process proceeds to step S907 after step S905. In step S907, the control circuit 622 determines whether an untested equalizer setting exists. If the untested equalizer setting exists, in step S908, the control circuit 622 updates the equalizer setting. After step S908, the process returns to step S901 in which the subsequently received signal S_Rx (i.e., the first signal) is modulated according to the updated equalizer setting by the equalizer module 61. Then, steps S902 and S903 are repeated. If the untested equalizer setting does not exist, in step S909, the control circuit 622 configures the equalizer module 61 to be operating in the power mode corresponding to the optimal eye-width information.

In other words, in the exemplary embodiment of FIG. 9, each equalizer setting corresponds to one power mode. In the example with the Continuous-Time Linear Equalizer low power mode, the Continuous-Time Linear Equalizer high power mode and the Decision Feedback Equalizer mode, if the optimal eye-width information is obtained by using an equalizer setting corresponding to the Continuous-Time Linear Equalizer low power mode, the equalizer module 61 can be configured to be operating in the Continuous-Time Linear Equalizer low power mode; if the optimal eye-width information is obtained by using the equalizer setting corresponding to the Continuous-Time Linear Equalizer high power mode, the equalizer module 61 can be configured to be operating in the Continuous-Time Linear Equalizer high power mode; or, if the optimal eye-width information is obtained by using the equalizer setting corresponding to the Decision Feedback Equalizer mode, the equalizer module 61 can be configured to be operating in the Decision Feedback Equalizer mode.

It should be noted that, in one exemplary embodiment of FIG. 8 or FIG. 9, the operation of updating the equalizer setting may not involve changing the used power mode. For example, if the current equalizer setting uses the Continuous-Time Linear Equalizer low power mode, the operation of updating the equalizer setting may only involve updating the equalizer parameter used based on the Continuous-Time Linear Equalizer low power mode. In addition, in one exemplary embodiment of FIG. 8 or FIG. 9, an equalizer setting corresponding to one specific power mode may be unrelated to or different from that specific power mode. For example, an equalizer setting corresponding to the Continuous-Time Linear Equalizer low power mode, an equalizer setting corresponding to the Continuous-Time Linear Equalizer high power mode and an equalizer setting corresponding to the Decision Feedback Equalizer mode may all use the Continuous-Time Linear Equalizer low power mode.

Figure 10:
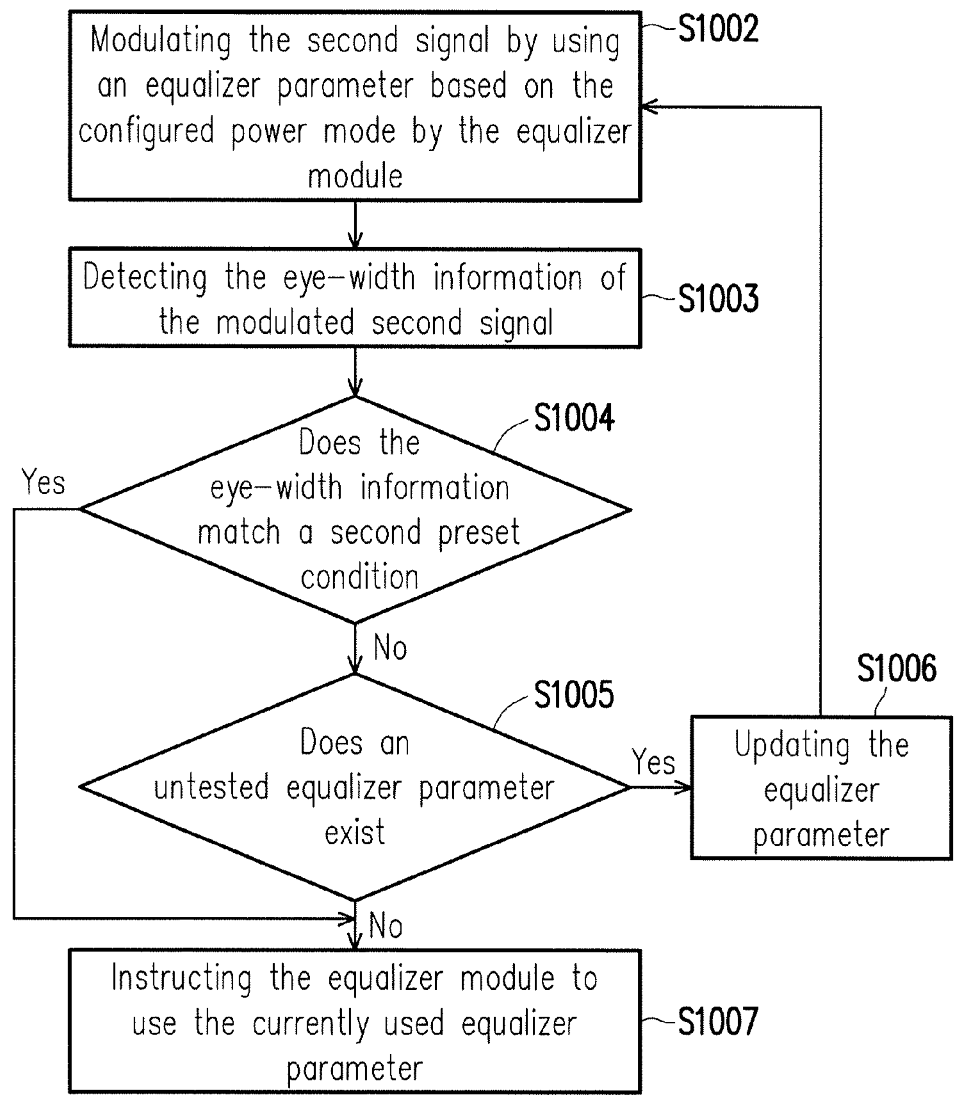
FIG. 10 is a flowchart illustrating an equalizer adjustment method according to another exemplary embodiment of the disclosure.

FIG. 10 is a flowchart illustrating an equalizer adjustment method according to another exemplary embodiment of the disclosure. It should be noted that, the process in FIG. 10 refers to details of step S703 and S704 in an exemplary embodiment of FIG. 7.

Referring to FIG. 6 and FIG. 10, in step S1002, the equalizer module 61 modulates the signal S_Rx (i.e., the second signal) by using one equalizer parameter based on the configured power mode and generates the signal S_Rx'. In step S1003, the eye-width information detection circuit 621 detects the eye-width information Inf_EW of the signal S_Rx' (i.e., the modulated second signal). In step S1004, the control circuit 622 determines whether the eye-width information Inf_EW matches a second preset condition. The second preset condition may be identical to or different from the first preset condition.

In the present exemplary embodiment, the control circuit 622 determines whether the eye-width information Inf_EW matches the second preset condition according to the eye-width of the signal S_Rx'. For example, the control circuit 622 can determine whether the eye-width of the signal S_Rx' is greater than a second preset eye-width. The second preset eye-width may be identical to or different from the first preset eye-width. If the eye-width of the signal S_Rx' is greater than the second preset eye-width, the control circuit 622 can determine that the eye-width information Inf_EW matches the second preset condition. Otherwise, if the eye-width of the signal S_Rx' is not greater than the second preset eye-width, the control circuit 622 can determine that the eye-width information Inf_EW does not match the second preset condition. Further, in another exemplary embodiment, the control circuit 622 can also determine whether the eye-width information Inf_EW matches the second preset condition according to information like the eye-height of the signal S_Rx' and/or the eye-shape of the signal S_Rx'.

If the eye-width information Inf_EW matches the second preset condition, in step S1007, the control circuit 622 instructs the equalizer module 61 to use the currently used equalizer parameter. In other words, the currently used equalizer parameter may be regarded as the optimal equalizer parameter corresponding to current channel status. If the eye-width information Inf_EW does not match the second preset condition, in step S1005, whether an untested equalizer parameter exists is determined. If the untested equalizer parameter exists, in step S1006, the control circuit 622 updates the equalizer parameter and returns to step S1002. For example, the control circuit 622 updates the equalizer parameter used by the equalizer module 61 from the current equalizer parameter into the next untested equalizer parameter. In step S1002 being repeated, the subsequently received signal S_Rx (i.e., the second signal) is modulated by using the updated equalizer parameter based on the configured power mode by the equalizer module 61, and then steps S1003 and S1004 are repeated. On the other hand, if the untested equalizer parameter does not exist (i.e., all the equalizer parameters have been tested), the process proceeds to step S1007 after step S1005.

In an exemplary embodiment of FIG. 10, the first used (tested) equalizer parameter has the poorest compensation ability, and the last used (tested) equalizer parameter has the strongest compensation ability. The most suitable equalizer parameter may be determined after testing these equalizer parameters one-by-one. Further, in another exemplary embodiment, a use sequence of the equalizer parameters may also be changed.

Figure 11:
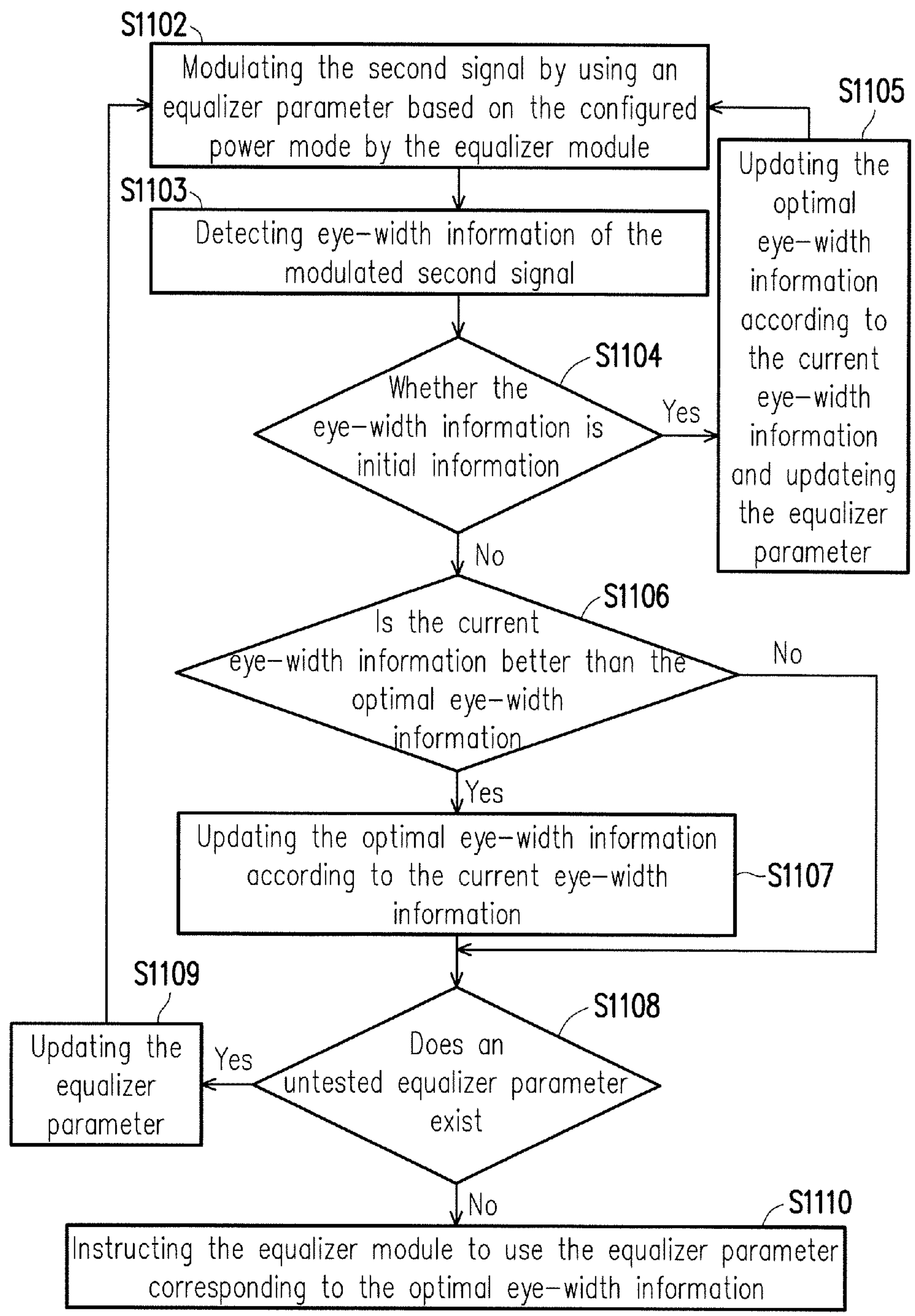
FIG. 11 is a flowchart illustrating an equalizer adjustment method according to another exemplary embodiment of the disclosure.

FIG. 11 is a flowchart illustrating an equalizer adjustment method according to another exemplary embodiment of the disclosure. It should be noted that, the process in FIG. 11 refers to details of step S703 and S704 in another exemplary embodiment of FIG. 7.

Referring to FIG. 6 and FIG. 11, in step S1102, the signal S_Rx (i.e., the second signal) is modulated by using one equalizer parameter based on the configured power mode by the equalizer module 61. In step S1103, the eye-width information detection circuit 621 detects the eye-width information Inf_EW of the signal S_Rx' (i.e., the modulated second signal). In step S1104, the control circuit 622 determines whether the current eye-width information h f EW is initial information (i.e., the first recorded eye-width information). If the current eye-width information Inf_EW is the initial information, in step S1105, the control circuit 622 updates the optimal eye-width information according to the current eye-width information Inf_EW and updates the equalizer parameter. For example, the control circuit 622 can record the current eye-width information Inf_EW to be a temporary value of the optimal eye-width information. After step S1105, the process returns to step S1102 in which the subsequently received signal S_Rx (i.e., the second signal) is modulated by using the updated equalizer parameter based on the previous configured power mode by the equalizer module 61. Then, steps S1103 and S1104 are repeated.

If the current eye-width information Inf_EW is not the initial information (i.e., the optimal eye-width information has already been recorded), in step S1106, the control circuit 622 determines whether the current eye-width information Inf_EW is better than the optimal eye-width information. For example, the control circuit 622 can determine whether the eye-width of the signal S_Rx' is greater than the eye-width corresponding to the optimal eye-width information. If the eye-width of the current signal S_Rx' is greater than the eye-width corresponding to the optimal eye-width information, the control circuit 622 can determine that the current eye-width information Inf_EW is better than the optimal eye-width information. Conversely, if the eye-width of the current signal S_Rx' is not greater than the eye-width corresponding to the optimal eye-width information, the control circuit 622 can determine that the current eye-width information Inf_EW is not better than the optimal eye-width information. It should be noted that, in another exemplary embodiment, the control circuit 622 may also determine whether the current eye-width information Inf_EW is better than the optimal eye-width information according to the eye-height and/or the eye-shape of the current signal S_Rx'.

If the current eye-width information Inf_EW is better than the optimal eye-width information, in step S1107, the control circuit 622 updates the optimal eye-width information according to the current eye-width information Inf_EW. For example, the control circuit 622 can replace the temporary value of the optimal eye-width information by the current eye-width information Inf_EW. Further, if the current eye-width information Inf_EW is not better than the optimal eye-width information, the process proceeds to step S1108 after step S1106. In step S1108, the control circuit 622 determines whether an untested equalizer parameter exists. If the untested equalizer parameter exists, in step S1109, the control circuit 622 updates the equalizer parameter. After step S1109, the process returns to step S1102 in which the subsequently received signal S_Rx (i.e., the second signal) is modulated by using the updated equalizer parameter based on the previous configured power mode by the equalizer module 61. Then, steps S1103 and S1104 are repeated. If the untested equalizer parameter does not exist, in step S1110, the control circuit 622 instructs the equalizer module 61 to use the equalizer parameter corresponding to the optimal eye-width information.

It should be noted that, the flowcharts of FIG. 7 to FIG. 11 are merely examples. In an exemplary embodiment, it falls within the scope of the disclosure as long as the operation uses different equalizer settings in one by one (or parallel) manner to determine the power mode to be configured before the connection between the memory storage device 10 and the host system 11 is established (e.g., within the handshake operation of the memory storage device 10 with the host system 11) and uses different equalizer parameters in one by one (or parallel) manner to determine the optimal equalizer parameter based on the configured power mode after the connection between memory storage device 10 and the host system 11 is established (e.g., after the handshake operation is completed).

Nevertheless, each of steps depicted in FIG. 7 to FIG. 11 have been described in detail as above, and thus related description is not repeated hereinafter. It should be noted that, the steps depicted in FIG. 7 to FIG. 11 may be implemented as a plurality of program codes or circuits, which are not particularly limited in the disclosure. Moreover, the methods disclosed in FIG. 7 to FIG. 11 may be implemented with reference to above embodiments, or may be implemented separately, which are not particularly limited in the disclosure.

In summary, the adaptive equalizer can collect information to be at least partially used for determining the power mode (or the specific power mode can be configured according to such information) in the period during which the memory storage device performs the handshake operation. Therefore, after the handshake operation is completed, the adaptive equalizer can (directly) search for the optimal equalizer parameter based on the specific power mode. Compared to the conventional art in which testing on the equalizer parameter—or even the power mode—can be started only after the handshake operation is completed, the adjustment efficiency of the adaptive equalizer may be improved. Furthermore, because at least part of the adjustment operation performed by the adaptive equalizer is started in the period during which the handshake operation is performed, the conventional issue that the equalizer adjustment operation cannot be completed performed—due to the time length preserved for adjusting the adaptive equalizer being too short—may also be improved.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An equalizer adjustment method for a memory storage device having an adaptive equalizer, the equalizer adjustment method comprising:

performing a handshake operation to establish a connection with a host system;

in the handshake operation, receiving a first signal from the host system and performing a first modulation on the first signal by the adaptive equalizer;

after the handshake operation is ended, receiving a second signal from the host system and performing a second modulation on the second signal according to a modulation result of the first modulation by the adaptive equalizer to compensate the second signal; and adjusting the adaptive equalizer according to a modulation result of the second modulation.

2. The equalizer adjustment method according to claim 1, further comprising:

in the handshake operation, transmitting a third signal to the host system, wherein the first signal and the third signal are both used to establish the connection in the handshake operation.

3. The equalizer adjustment method according to claim 1, wherein the memory storage device does not transmit signal to the host system in a period during which the second modulation is performed.

4. The equalizer adjustment method according to claim 1, further comprising:

adjusting the adaptive equalizer according to the modulation result of the first modulation.

5. The equalizer adjustment method according to claim 4, wherein the step of adjusting the adaptive equalizer according to the modulation result of the first modulation comprises:

determining a power mode according to the modulation result of the first modulation by the adaptive equalizer, wherein the step of performing the second modulation on the second signal according to the modulation result of the first modulation by the adaptive equalizer comprises:

modulating the second signal by using at least one equalizer parameter based on the determined power mode.

6. The equalizer adjustment method according to claim 5, wherein the step of determining the power mode according to the modulation result of the first modulation by the adaptive equalizer comprises:

detecting eye-width information of the modulated first signal; and determining the power mode from a plurality of candidate power modes according to the eye-width information, wherein the candidate power modes comprise a first power mode and a second power mode, wherein a power consumption of the adaptive equalizer operating in the first power mode is higher than a power consumption of the adaptive equalizer operating in the second power mode.

7. The equalizer adjustment method according to claim 6, wherein the candidate power modes comprise at least two of a Continuous-Time Linear Equalizer low power mode, a Continuous-Time Linear Equalizer high power mode and a Decision Feedback Equalizer mode.

8. The equalizer adjustment method according to claim 5, wherein a power mode used by the adaptive equalizer is unchanged in the step of modulating the second signal by using the at least one equalizer parameter based on the determined power mode.

9. An adaptive equalizer for a memory storage device, the adaptive equalizer comprising:

an equalizer module; and a control circuit, coupled to the equalizer module, wherein the equalizer module is configured to receive a first signal from a host system and perform a first modulation on the first signal in a period during which a handshake operation is performed by the memory storage device to establish a connection with the host system;

wherein the equalizer module is further configured to receive a second signal from the host system and perform a second modulation on the second signal according to a modulation result of the first modulation to compensate the second signal after the handshake operation is ended, wherein the control circuit is configured to adjust the equalizer module according to a modulation result of the second modulation.

10. The adaptive equalizer according to claim 9, wherein the memory storage device is configured to transmit a third signal to the host system in the handshake operation, wherein the first signal and the third signal are both used to establish the connection in the handshake operation.

11. The adaptive equalizer according to claim 9, wherein the memory storage device does not transmit signal to the host system in a period during which the second modulation is performed by the equalizer module.

12. The adaptive equalizer according to claim 9, wherein the control circuit is further configured to adjust the equalizer module according to the modulation result of the first modulation.

13. The adaptive equalizer according to claim 12, wherein the operation of adjusting the equalizer module according to the modulation result of the first modulation by the control circuit comprises:

determining a power mode according to the modulation result of the first modulation, wherein the operation of performing the second modulation on the second signal according to the modulation result of the first modulation by the equalizer module comprises:

modulating the second signal by using at least one equalizer parameter based on the determined power mode.

14. The adaptive equalizer according to claim 13, wherein the operation of determining the power mode according to the modulation result of the first modulation by the control circuit comprises:

detecting eye-width information of the modulated first signal; and determining the power mode from a plurality of candidate power modes according to the eye-width information, wherein the candidate power modes comprise a first power mode and a second power mode, wherein a power consumption of the equalizer module operating in the first power mode is higher than a power consumption of the equalizer module operating in the second power mode.

15. The adaptive equalizer according to claim 14, wherein the candidate power modes comprise at least two of a Continuous-Time Linear Equalizer low power mode, a Continuous-Time Linear Equalizer high power mode and a Decision Feedback Equalizer mode.

16. The adaptive equalizer according to claim 13, wherein a power mode used by the equalizer module is unchanged in the operation of modulating the second signal by using the at least one equalizer parameter based on the determined power mode by the equalizer module.

17. A memory storage device, comprising:

a connection interface unit, configured to couple to a host system;

a rewritable non-volatile memory module; and a memory control circuit unit, coupled to the connection interface unit and the rewritable non-volatile memory module, wherein the connection interface unit comprises an adaptive equalizer, wherein the memory control circuit unit is configured to perform a handshake operation to establish a connection with the host system, wherein the adaptive equalizer is configured to receive a first signal from the host system and perform a first modulation on the first signal in the handshake operation, wherein the adaptive equalizer is further configured to receive a second signal from the host system and perform a second modulation on the second signal according to a modulation result of the first modulation to compensate the second signal after the handshake operation is ended, wherein the adaptive equalizer is further configured to perform a self-adjustment according to a modulation result of the second modulation.

18. The memory storage device of claim 17, wherein the memory control circuit unit is further configured to transmit a third signal to the host system in the handshake operation, wherein the first signal and the third signal are both used to establish the connection in the handshake operation.

19. The memory storage device of claim 17, wherein the memory control circuit unit does not transmit signal to the host system in a period during which the second modulation is performed by the adaptive equalizer.

20. The memory storage device of claim 17, wherein the adaptive equalizer is further configured to perform the self-adjustment according to the modulation result of the first modulation.

21. The memory storage device of claim 20, wherein the operation of performing the self-adjustment according to the modulation result of the first modulation by the adaptive equalizer comprises:

determining a power mode according to the modulation result of the first modulation, wherein the operation of performing the second modulation on the second signal according to the modulation result of the first modulation by the adaptive equalizer comprises:

modulating the second signal by using at least one equalizer parameter based on the determined power mode.

22. The memory storage device of claim 21, wherein the operation of determining the power mode according to the modulation result of the first modulation by the adaptive equalizer comprises:

detecting eye-width information of the modulated first signal; and determining the power mode from a plurality of candidate power modes according to the eye-width information, wherein the candidate power modes comprise a first power mode and a second power mode, wherein a power consumption of the adaptive equalizer operating in the first power mode is higher than a power consumption of the adaptive equalizer operating in the second power mode.

23. The memory storage device of claim 22, wherein the candidate power modes comprise at least two of a Continuous-Time Linear Equalizer low power mode, a Continuous-Time Linear Equalizer high power mode and a Decision Feedback Equalizer mode.

24. The memory storage device of claim 21, wherein a power mode used by the adaptive equalizer is unchanged in the operation of modulating the second signal by using the at least one equalizer parameter based on the determined power mode by the adaptive equalizer.

* * * * *